United States Patent
Frank et al.

(10) Patent No.: US 6,662,825 B2
(45) Date of Patent: Dec. 16, 2003

(54) CONTROL DEVICE FOR PRESSURIZED FLUIDS

(75) Inventors: Dieter Frank, Hannover (DE); Oliver Gründker, Wedemark (DE); Peter Homann, Neustadt (DE); Andreas Kranz, Wunstorf (DE); Rainer Risse, Pattensen (DE); Gerdt Schreiber, Isernhagen (DE)

(73) Assignee: Wabco GmbH & Co. OHG, Hannover (DE)

( * ) Notice: Subject to any disclaimer, the term of this patent is extended or adjusted under 35 U.S.C. 154(b) by 17 days.

(21) Appl. No.: 10/073,726

(22) Filed: Feb. 11, 2002

(65) Prior Publication Data

US 2002/0112765 A1 Aug. 22, 2002

(30) Foreign Application Priority Data

Feb. 16, 2001 (DE) .......................... 101 07 239

(51) Int. Cl.⁷ ............................................. F15B 13/043
(52) U.S. Cl. .................. 137/557; 137/596.16; 137/884; 303/119.3
(58) Field of Search ............................ 137/557, 596.16, 137/884; 303/119.2, 119.3

(56) References Cited

U.S. PATENT DOCUMENTS

| | | | | |
|---|---|---|---|---|
| 5,152,322 A | * | 10/1992 | Maas et al. ................ | 137/884 |
| 5,275,478 A | * | 1/1994 | Schmitt et al. ............ | 137/884 |
| 5,292,260 A | | 3/1994 | Sinisi et al. | |
| 5,326,161 A | * | 7/1994 | Adams et al. ........... | 303/119.2 |
| 5,437,306 A | * | 8/1995 | Asou et al. ................ | 137/884 |
| 5,474,108 A | | 12/1995 | Inden et al. | |
| 5,513,905 A | * | 5/1996 | Zeides et al. ............ | 303/119.3 |
| 5,520,546 A | | 5/1996 | Klinger et al. | |
| 5,941,282 A | * | 8/1999 | Suzuki et al. ............ | 137/884 |
| 6,347,845 B1 | * | 2/2002 | Engfer et al. ............ | 303/119.3 |

FOREIGN PATENT DOCUMENTS

| | | |
|---|---|---|
| DE | 37 42 320 A1 | 6/1989 |
| DE | 38 13 138 A1 | 11/1989 |
| DE | 40 01 017 A1 | 7/1991 |
| DE | 41 00 967 A1 | 7/1992 |
| DE | 43 32 205 C2 | 3/1994 |
| DE | 43 43 325 A1 | 6/1995 |
| DE | 195 08 011 C2 | 9/1995 |
| DE | 195 32 763 A1 | 3/1997 |
| DE | 195 45 011 A1 | 4/1997 |
| DE | 196 19 968 A1 | 11/1997 |
| DE | 197 47 142 A1 | 5/1998 |
| DE | 196 49 402 A1 | 6/1998 |
| DE | 197 43 842 A1 | 4/1999 |
| EP | 0 893 636 A1 | 1/1999 |

* cited by examiner

*Primary Examiner*—Gerald A. Michalsky
(74) *Attorney, Agent, or Firm*—Kramer Levin Naftalis & Frankel LLP

(57) ABSTRACT

A control device for pressurized fluids includes a valve mechanism actuated by a first device incorporating electromagnets in a first housing, and a second device incorporating a circuit board for controlling the valve mechanism in a second housing. Pins on the first device and sockets on the second device automatically form an electrical plug-type connection when the housings are joined. Each socket is received in a first portion of a through-hole provided in a mount supported on the circuit board such that it extends into a corresponding through-hole in the circuit board. A second portion of each through-hole in each mount has a funnel-shaped guide opening toward the pins. A pressure sensor supported by the circuit board forms a plug-type engagement with a port extending from the valve mechanism when the housings are joined. Contacts extend from the sensor into holes in the circuit board.

39 Claims, 2 Drawing Sheets

US 6,662,825 B2

CONTROL DEVICE FOR PRESSURIZED FLUIDS

BACKGROUND OF THE INVENTION

The present invention is directed generally to a control device for pressurized fluids and, in particular, to a control device having an improved electric plug-type connection arranged and constructed to provide improved positional accuracy and stability.

A conventional control device of the general type under consideration (for example, Device No. 884 009 650 0 of WABCO GmbH, the assignee of the present application) includes first and second housing components which are joined together. An electrically controllable valve mechanism disposed in the first housing component is actuated by means of electronic circuitry disposed in the second housing component. Female connector sockets and male connector pins, which together form an electric plug-type connection when the two housing components are joined, electrically connect the valve mechanism to the electronic circuitry.

It is desired to improve the structure and arrangement of the electric plug-type connection in a control device of the type under discussion to achieve improved positional accuracy and stability.

SUMMARY OF THE INVENTION

Generally speaking, in accordance with the present invention, a control device for pressurized fluid is provided. The control device includes first and second housing components arranged and constructed to be removably coupled together. A first electric device including a pair of electromagnets is disposed in the first housing component in communication with inlet and outlet valves. Electrical connector pins extend from the electromagnets. A second electric device including a circuit board and electrical contacts is disposed in the second housing component and controls the valves in the first housing component. The electrical contacts in the second housing component are arranged and constructed to receive the electrical connector pins extending from the electromagnets in the first housing component. The connector pins and contacts form an electrical connection when the first and second housing components are joined together.

Mounts for the electrical contacts in the second housing component are provided on the side of the circuit board opposite the connector pins. The mounts may be formed from two parts that are fastened together and may be latched to the circuit board. The mounts have through-holes for receiving the electrical contacts. The through-holes in the mounts are oriented substantially coaxially with through-holes in the circuit board. The electrical contacts are disposed in the through-holes in the mounts such that they extend through the through-holes in the circuit board where they may be soldered to the conductor tracks disposed on the circuit board. The through-holes in the mounts may be provided with regions flaring in the form of a funnel in the direction of the connector pins allocated thereto. The funnels function as entry guides for the connector pins.

A pressure sensor may be disposed in the second housing component such that it forms a plug-type engagement with a port extending from the inlet valve when the first and second housing components are joined together. The pressure sensor is supported by the circuit board in the second housing component. Electrical contact elements extend from the pressure sensor through holes in the printed circuit board where they may be soldered to the conductor tracks disposed on the circuit board.

Accordingly, it is an object of the present invention to provide an improved device for controlling the flow of pressurized fluid.

Another object of the present invention is to provide a control device for pressurized fluid in which the structure and arrangement of the electric plug-type connection is improved to provide improved positional accuracy and stability.

A further object of the present invention is to provide an improved control device for pressurized fluid that may be assembled more efficiently and in less time than a conventional control device.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
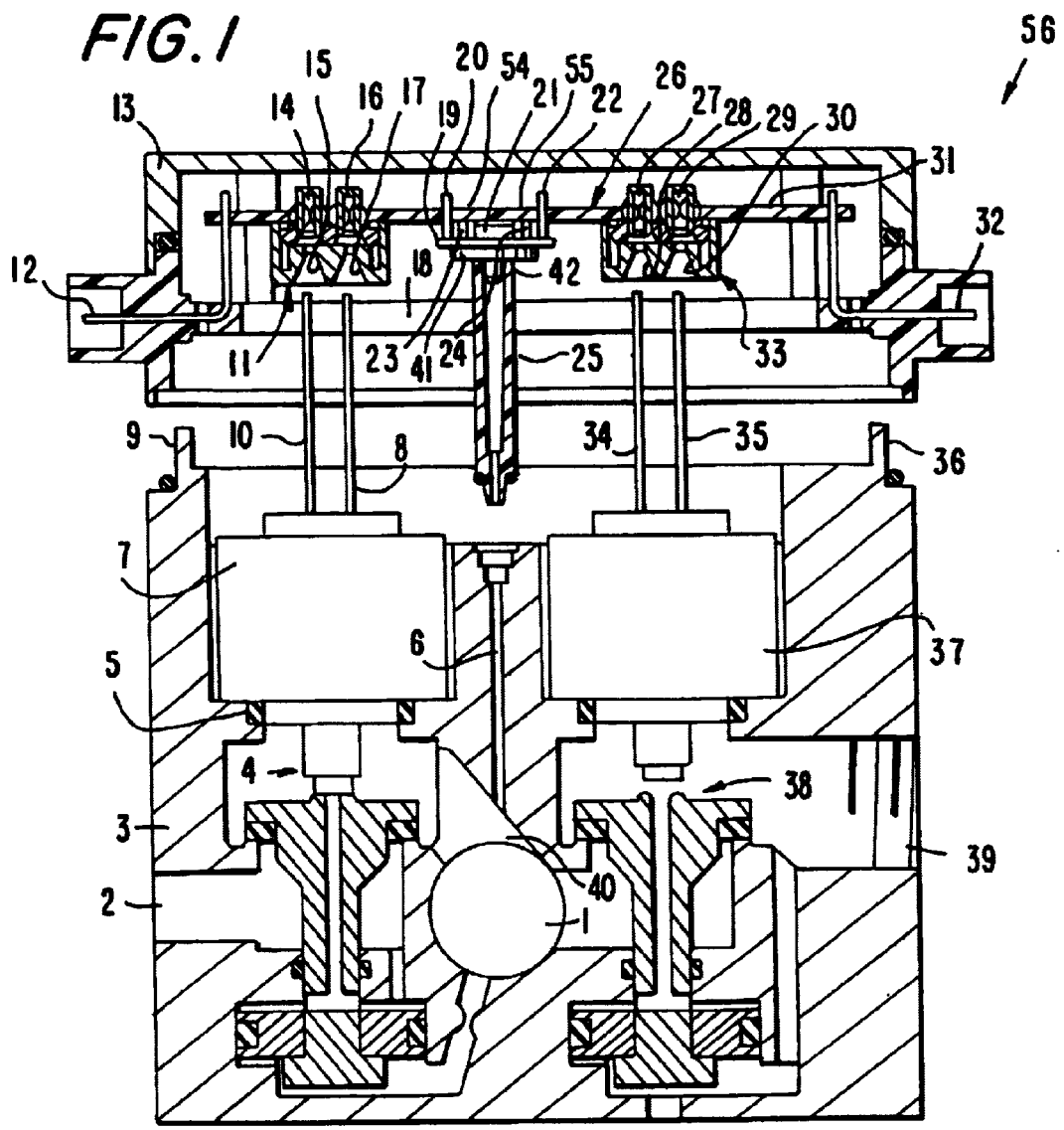
FIG. 1 is a cross-sectional view of a preferred embodiment of a control device for pressurized fluids constructed in accordance with the present invention.

Referring to the drawing figures where like reference numerals are used for corresponding parts, FIG. 1 shows a control device for pressurized fluid generally indicated as 56 constructed in accordance with a preferred embodiment of the present invention. Control device 56 has a housing including a first housing component 3 and a second housing component 13. First housing component 3 and second housing component 13 can be detachably joined to one another by fasteners (not shown) such as, for example, screws. Second housing component 13 functions as a cover for housing 3, 13.

A valve mechanism comprising two controllable valves—an inlet valve 4 and an outlet valve 38—is disposed in first housing component 3. It should be appreciated that the invention is not necessarily limited to a dual-valve arrangement.

Inlet valve 4 and outlet valve 38 are actuated by a first electric device which is formed by a first electromagnet 7 allocated to inlet valve 4 and a second electromagnet 37 allocated to outlet valve 38. First and second electromagnets 7, 37 are disposed in first housing component 3 where they are separated from inlet valve 4 and from outlet valve 38 by a housing wall 5, the movable actuators of electromagnets 7, 37 that cooperate with inlet valve 4 and outlet valve 38 being guided via through-holes disposed in the housing wall.

Sealing elements are disposed between electromagnets 7, 37 and the regions of housing wall 5 bounding the through-holes. In this way, first housing component 3 is constructed as a closed housing for inlet valve 4 and outlet valve 38.

Inlet valve 4 and outlet valve 38 each have one pressurized-fluid inlet chamber and one pressurized-fluid outlet chamber. The pressurized-fluid inlet chamber of inlet valve 4 is in communication with a pressurized-fluid source (not shown), such as a compressed-air accumulator, via a pressurized-fluid inlet 2. The pressurized-fluid outlet chamber of inlet valve 4, which is denoted by reference number 40, is in communication with a load point (not shown), such as a brake cylinder of a vehicle brake system, via a pressurized-fluid outlet 1. The pressurized-fluid inlet chamber of outlet valve 38 is also in communication with pressurized-fluid outlet 1 of inlet valve 4. The pressurized-fluid outlet chamber of outlet valve 38, which is denoted by reference number 39, is in communication with a pressurized-fluid sink, such as the atmosphere. Inlet valve 4 may be provided with an additional pressurized-fluid port 6, which extends from pressurized-fluid outlet chamber 40 of inlet valve 4 toward second housing component 13.

A frame 18, which functions as a mount for a second electric device 26, is disposed in second housing component 13. Frame 18 is preferably formed from plastic.

On the side of first housing component 3 facing second housing component 13, projections 9, 36 extend toward second housing component 13 such that they make contact with the inside of frame 18 when first housing component 3 is joined with second housing component 13. Projections 9, 36 function to align the first and second housing components 3, 13 with one another when the two housing components are joined together.

Each of the two electromagnets 7, 37 is provided with a plurality of electrical contact elements which extend toward a component of second electric device 26 preferably designed as a printed circuit board 31. The electrical contact elements are desirably constructed as elastically deformable connector pins which function as male components 8, 10, 34, 35 of an electric plug-type connection.

A first mount 11 and a second mount 33 for electrical contact elements are arranged on that side of circuit board 31 which faces male components 8, 10, 34, 35. The electrical contact elements are formed like a pot and serve as female components 16, 14, 27, 29 for the electric plug-type connection. Mounts 11, 33 are desirably formed from an electrically nonconductive material such as, for example, plastic.

Figure 2:
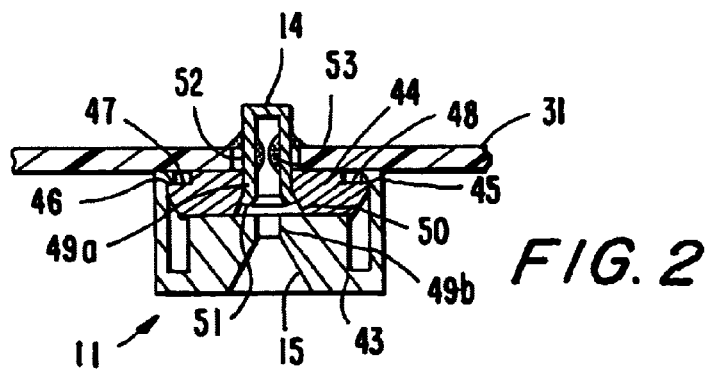
FIG. 2 is an enlarged sectional detail view of the mount portion of the control device depicted in FIG. 1.

As shown in FIG. 2, first mount 11 has a through-hole 49a, 49b allocated to each of male components 8, 10 of first electromagnet 7. Each through-hole 49a, 49b is oriented in the direction of the longitudinal axis of male components 8, 10. Each through-hole 49a, 49b has at its end facing away from printed circuit board 31 a region flaring in the form of a funnel toward male components 8, 10 allocated thereto. The funnel portions of each through-hole 49a, 49b function as entry guides 17, 15 for male components 8, 10. Female components 16, 14 are disposed in the region of each through-hole 49a, 49b adjoined by the funnel portions so that their open ends adjoin entry guides 17, 15, respectively.

Referring now to FIG. 1, second mount 33, which is preferably structurally the same as mount 11, has through-holes 49a, 49b which are each allocated to male components 34, 35 of second electromagnet 37 and which are each oriented in the direction of the longitudinal axis of male components 34, 35. Each of through-holes 49a, 49b has at its end facing away from printed circuit board 31 a region flaring in the form of a funnel toward male components 34, 35 allocated thereto. The funnel portions of each through-hole 49a, 49b in second mount 33 function as entry guides 28, 30 for male components 34, 35. Female components 27, 29 are disposed in the region of each through-hole 49a, 49b adjoined by the funnel portions so that their open ends adjoin entry guides 28, 30.

Desirably, the length of each of female components 16, 14, 27, 29 is such that the closed ends of female components 16, 14, 27, 29 project from each through-hole 49a, 49b of mounts 11, 33 and extend through printed circuit board 31 via holes 52 which are oriented substantially coaxially with the through-holes of mounts 11, 33 when mounts 11, 33 bear with their sides facing away from male components 8, 10, 34, 35 on circuit board 31. Printed circuit board 31 may be connected to external electric devices via connector pins 12, 32 disposed on frame 18.

A pressure sensor 21 is disposed in second housing component 13. Pressure sensor 21 can be connected to additional pressurized-fluid port 6 of pressurized-fluid outlet chamber 40 of inlet valve 4 via a pressurized-fluid port 42 and a tubular connecting component 25. Additional pressurized-fluid port 6 and the end of connecting component 25 facing it are arranged and constructed so that they form a pressurized-fluid plug-type connection when housing components 3, 13 are joined together.

Desirably, pressure sensor 21 is disposed on a disk-shaped mount 41 made of electrically nonconductive material such as, for example, plastic. A rim region 19 of mount 41 has molded-on members 23, 24 which are formed as supports and which function to brace mount 41 against printed circuit board 31. Molded-on members 23, 24 are oriented substantially in the direction of the longitudinal axis of mount 41 and of pressure sensor 21, and extend toward printed circuit board 31.

Pin-like electrical contact elements 20, 22 extending toward printed circuit board 31 are also disposed in rim region 19 of mount 41. Electrical contact elements 20, 22 extend through holes 54, 55, respectively, in printed circuit board 31 when mount 41 bears with its molded-on members 23, 24 against printed circuit board 31. With their ends placed directly on or in mount 41, electrical contact elements 20, 22 are connected to the electric component of pressure sensor 21; and with their opposing ends guided through printed circuit board 31, they are connected by soldering to the conductor tracks disposed on printed circuit board 31.

Preferably, pressurized-fluid port 42 of pressure sensor 21 is not disposed directly on pressure sensor 21, but on the side of mount 41 facing away from pressure sensor 21.

When first housing component 3 is joined with second housing component 13, male components 8, 10, 34, 35 engage entry guides 17, 15, 28, 30 of female components 16, 14, 27, 29 allocated thereto, and connecting component 25 for the pressurized-fluid connection engages an entry guide of additional pressurized-fluid port 6 only when projections 9, 36 of first housing component 3 have been sufficiently inserted into second housing component 13 such that the two housing components 3, 13 are aligned with one another. After this rough centering of housing components 3, 13, male components 8, 10, 34, 35 and female components 16, 14, 27, 29 of the electric plug-type connection are also coaxially aligned at least approximately with one another. Similarly, connecting component 25 and additional pressurized-fluid port 6 have also undergone alignment by rough centering such that they face one another in at least approximate coaxial relationship.

Referring to FIG. 2, mount 11 for the electrical contact elements formed as female components 16, 14 comprises a first mount component 43 and a preferably pot-shaped second mount component 44, which are detachably joined to one another. Desirably, tongue-like molded-on members 45, 46 of first mount component 43 are used to join first mount component 43 to second mount component 44. Tongue-like molded members 45, 46 are oriented substantially parallel to the longitudinal axis of each of first mount component 43 and second mount component 44 and extend toward second mount component 44. Tongue-like molded-on members 45, 46 each have a nose-like projection. The nose-like projections extend transversely relative to the longitudinal axis of each of first mount component 43 and second mount component 44 toward second mount component 44, and, after first mount component 43 and second mount component 44 have been joined together, each engages a step-like recess 47, 48 of second mount component 44 allocated thereto. First mount component 43 and second mount component 44 then bear against one another substantially with their sides facing one another.

Mount 11, which comprises first mount component 43 and second mount component 44, is preferably provided with a plurality of through-holes oriented in the direction of its longitudinal axis. For the sake of simplicity, only one through-hole 49a, 49b is depicted in the drawings. The connection point between first mount component 43 and second mount component 44 is, at the same time, the connection point between through-hole portion 49b disposed in first mount component 43 and through-hole portion 49a disposed in second mount component 44.

Through-hole portion 49b disposed in first mount component 43 is provided with entry guide 15 for male component 10, which entry guide flares in the form of a funnel toward male component 10. At the narrowest point of entry guide 15, the passage cross section is preferably equal to or smaller than the cross section of the hole in female component 14.

Through-hole portion 49a disposed in second mount component 44 has on its side facing first mount component 43 a region 50 flaring conically toward first mount component 43. Female component 14 is disposed in through-hole portion 49a such that its closed end projects out of through-hole 49a, 49b on the side of second mount component 44 facing away from first mount component 43. At its open end facing first mount component 43, female component 14 has a collar 51 which bears against conically flaring region 50 of through-hole portion 49a. Collar 51 prevents female component 14 from slipping out of through-hole 49a, 49b away from first mount component 43 and, once first mount component 43 and second mount component 44 have been joined together, first mount component 43 prevents female component 14 from slipping out of through-hole 49a, 49b toward first mount component 43. Preferably, rod-like or leaf-like spring elements 53 are disposed in female component 14 so that they are oriented in the direction of the longitudinal axis of female component 14 and are convex toward the imaginary centerline of female component 14.

First housing component 3, containing inlet valve 4 and outlet valve 38 as well as the first electric device comprising electromagnets 7, 37, is assembled together with second housing component 13, containing second electric device 26 and pressure sensor 21, by aligning second housing component 13 roughly with first housing component 3 and bringing its open end which faces the open end of first housing component 3 up against first housing component 3. In this process, projections 9, 36 of first housing component 3 come into contact, via a partial region of their outer surfaces, with the corresponding regions of the inside wall of frame 18 disposed in second housing component 13. In this stage of assembly, first housing component 3 and second housing component 13 automatically become aligned with one another. Male components 8, 10, 34, 35 formed as connector pins and funnel-shaped entry guides 17, 15, 28, 30 of female components 16, 14, 27, 29 formed as connector sockets, as well as the funnel-shaped entry guide of additional pressurized-fluid port 6 and the end region of connecting component 25 allocated thereto, then face one another in at least approximately exact position. During further movement of second housing component 13 toward first housing component 3, male components 8, 10, 34, 35 become inserted automatically into corresponding entry guides 17, 15, 28, 30 of female components 16, 14, 27, 29. At the same time, the free end region of connecting component 25 becomes inserted automatically in the entry guide of additional pressurized-fluid port 6. In this way, the electric plug-type connection and the pressurized-fluid plug-type connection are automatically established.

If a male component 8, 10, 34, 35 were not accurately facing its corresponding female component 16, 14, 27, 29, then, during further movement of second housing component 13 toward first housing component 3 male component 8, 10, 34, 35 in question would be guided by entry guide 17, 15, 28, 30 to its corresponding female component 16, 14, 27, 29 for insertion therein. Similarly, if connecting component 25 were not accurately facing additional pressurized-fluid port 6, connecting component 25 would be guided into additional pressurized-fluid port 6 by the entry guide of port 6. When second housing component 13 is seated on first housing component 3, the electric plug-type connection and the pressurized-fluid plug-type connection are established. First housing component 3 and second housing component 13 are then firmly fastened to one another, for example, by screws.

The forces occurring during deflection of male components 8, 10, 34, 35 are absorbed by first mount component 43 (provided with entry guides 17, 15, 28, 30) of mounts 11, 33 for female components 16, 14, 27, 29, and are transferred to second mount component 44, female components 16, 14, 27, 29 and printed circuit board 31. Rod-like or leaf-like spring elements 53 disposed in the interior of female components 16, 14, 27, 29 securely contact male components 8, 10, 34, 35, but are not subjected to the forces acting on first mount component 43, second mount component 44, female components 16, 14, 27, 29 and printed circuit board 31.

Figure 3:
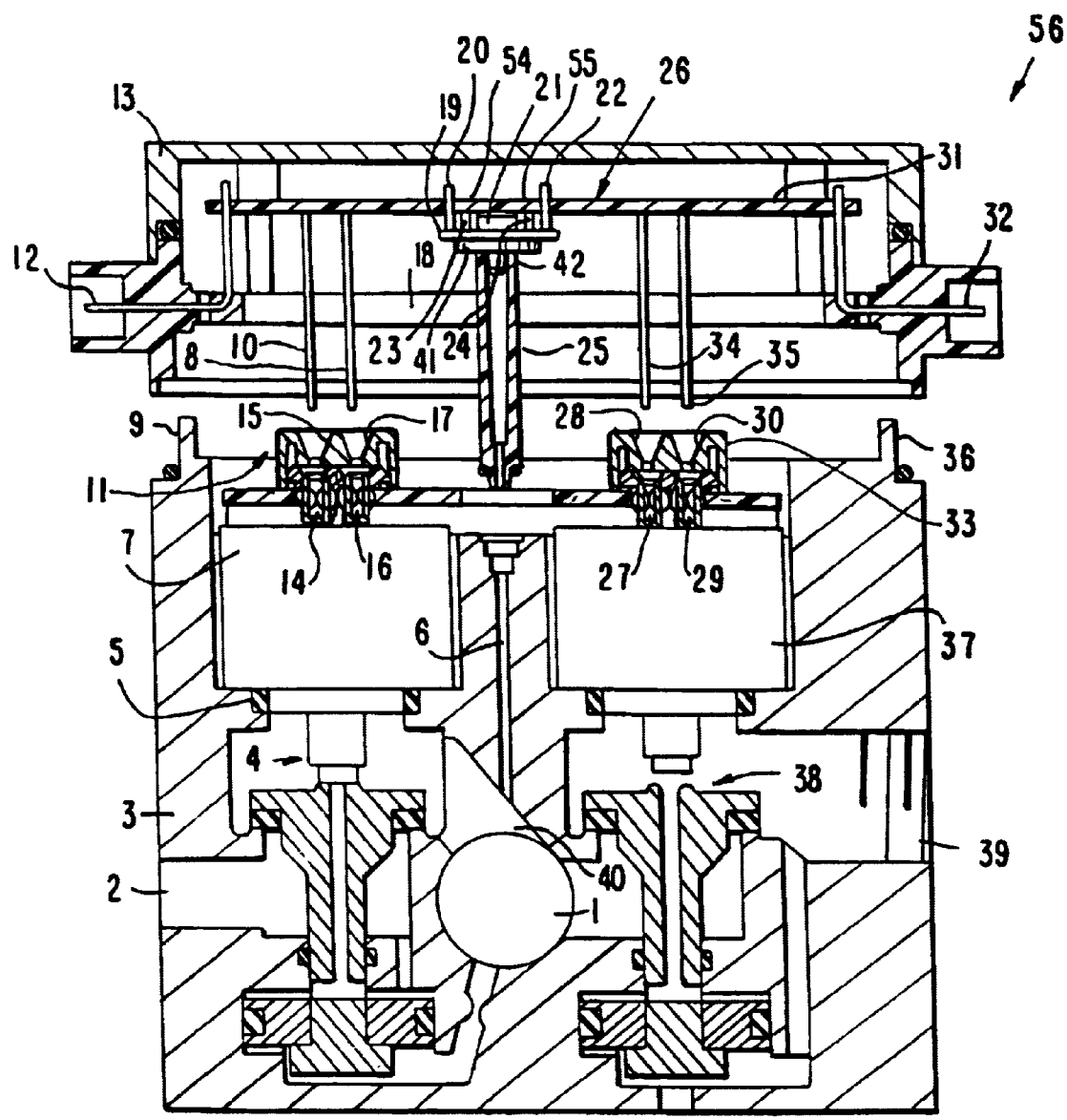
FIG. 3 is a cross-sectional view of an alternative embodiment of the inventive control device depicted in FIG. 1 in which the male and female electrical contacts are disposed in transposed position.

It should be understood that male components 8, 10, 34, 35 may also be disposed on second electric device 26 disposed in second housing component 13, and female components 16, 14, 27, 29 with entry guides 17, 15, 28, 30 may be disposed on first electric device disposed in first housing component 3 as depicted in FIG. 3.

At least one housing component 3 or 13 may be formed as a closed housing, from which connector pins functioning as male components are brought out, or in the wall of which are disposed sockets with entry guides functioning as female components. The closed housing and the housing component open at one end, or two independently closed housings, or even two housing components open at one end, may be regarded according to the invention as two housing components which form one housing when joined together.

According to the invention, mounts 11 and 33 for female components 16, 14, 27, 29 may also include latching mechanisms, which latch or snap into corresponding recesses of printed circuit board 31. The latching mechanisms may also be disposed on printed circuit board 31, in which case mounts 11, 33 are provided with the corresponding recesses.

Because of the unique structure and arrangement of mounts 11, 33 and of female components 16, 14, 27, 29 disposed thereon, and because of the unique structure and arrangement of mount 41 for pressure sensor 21 on printed circuit board 31, it is easy to insert components on printed circuit board 31 from one side. Electrical connections between female components 16, 14, 27, 29 and the printed circuit disposed on printed circuit board 31, as well as electrical connections between the electric component of pressure sensor 21 and the printed circuit may be made simply by wave soldering in a single work cycle.

As indicated above, it is desirable that each of the contact elements formed as female components 16, 14, 27, 29 projecting out of mounts 11, 33 extend in the direction of its longitudinal axis so far into through-hole 52 allocated thereto in printed circuit board 31 that its free end projects some distance out of through-hole 52 on the side of printed circuit board 31 facing away from mounts 11, 33. This arrangement is particularly advantageous where contact between the female components 16, 14, 27, 29 and the printed circuit is to be established by wave soldering. However, it should be appreciated that, according to the present invention, it is also possible to size each female component 16, 14, 27, 29 so that it extends only so far into through-hole 52 allocated thereto in printed circuit board 31 that its free end remains inside the through-hole. Contact between the female components and the printed circuit may then be achieved by suitable soldering methods other than wave soldering or by appropriate mechanical means.

Likewise, electrical contact elements 20, 22 of pressure sensor 21 maybe sized such that their free ends either remain inside holes 54, 55 allocated thereto in printed circuit board 31 or project some distance out of holes 54, 55 on the side of printed circuit board 31 facing away from pressure sensor 21.

Because of the soldered joint, the contact elements formed as female components 16, 14, 27, 29 are held together with their mounts 11, 33 on the substantially flat component formed as printed circuit board 31. This is also the case with regard to pressure sensor 21 and its mount 41.

Additionally, according to the present invention, electrical contact elements 20, 22 of pressure sensor 21 may be integrated into molded-on members 23, 24 of mount 41 for pressure sensor 21, for example, by guiding them through channel-like holes in molded-on members 23, 24 of mount 41.

Also, according to the present invention, any latching mechanisms used to join mount 41 to printed circuit board 31 may be disposed on mount 41 and or on the substantially flat component formed as printed circuit board 31. For this purpose, an extension through a hole allocated thereto in printed circuit board 31 may be disposed on each of molded-on members 23, 24. The extension can be formed, for example, by a stepped structure on the free end of the molded-on member. A nose-like projection may be disposed at the free end of the extension oriented transversely relative to the longitudinal axis of the extension and overlapping the portion of printed circuit board 31 bounding the hole in the circuit board after printed circuit board 31 and mount 41 have been joined together.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A control device for pressurized fluids comprising first and second housing components adapted to be removably coupled together, a first electric device in said first housing component, a second electric device in said second housing component, a valve mechanism in said first housing component in communication with said first electric device, said valve mechanism being controlled by said second electric device, said second electric device including a plate and at least one female electrical contact, said first electric device including at least one male electrical contact disposed opposite said at least one female contact, said at least one female contact and said at least one male contact forming an electric connection when said first and second housing components are joined together, a mount for said at least one female contact having at least one through-hole for receiving said at least one female contact, said mount being supported by said plate on a side facing said at least one male contact such that said at least one through-hole in said mount is oriented substantially coaxially with at least one through-hole in said plate, and said at least one female contact being disposed in said at least one through-hole in said mount such that it extends into said at least one through-hole in said plate.

2. A control device for pressurized fluids according to claim 1, wherein said at least one female contact extends from said mount through said at least one through-hole in said plate such that a distal end of said at least one female contact projects outwardly from said at least one through-hole in said plate on a side of said plate facing away from said mount.

3. A control device for pressurized fluids according to claim 1, wherein said at least one through-hole in said mount includes a funnel-shaped portion opening toward said at least one male contact for guiding said at least one male contact into said at least one through-hole in said mount.

4. A control device for pressurized fluids according to claim 3, wherein the cross-sectional size of said funnel-shaped portion at its narrowest point is at most equal to the cross-sectional size of a proximal end of said at least one female component.

5. A control device for pressurized fluids according to claim 1, further comprising at least one spring element disposed in said at least one female contact oriented in the direction of the longitudinal axis of said at least one female contact and convex toward an imaginary centerline of said at least one female contact.

6. A control device for pressurized fluids according to claim 1, wherein said mount for said at least one female contact is detachably joined to said plate by a fastener.

7. A control device for pressurized fluids according to claim 1, wherein said plate is designed as a printed circuit board.

8. A control device for pressurized fluids according to claim 1, wherein said first electric device includes at least one electromagnet.

9. A control device for pressurized fluids comprising first and second housing components adapted to be removably coupled together, a first electric device in said first housing component, a second electric device in said second housing component, a valve mechanism in said first housing component in communication with said first electric device, said valve mechanism being controlled by said second electric device, said second electric device including a plate and at least one female electrical contact, said first electric device including at least one male electrical contact disposed opposite said at least one female contact, said at least one female contact and said at least one male contact forming an electric connection when said first and second housing components are joined together, a mount for said at least one female contact having at least one through-hole for receiving said at least one female contact, said mount being supported by said plate on a side facing said at least one male contact such that said at least one through-hole in said mount is oriented substantially coaxially with at least one through-hole in said plate, said at least one female contact being disposed in said at least one through-hole in said mount such that it extends into said at least one through-hole in said plate, said at least one through-hole in said mount including a funnel-shaped portion opening toward said at least one male contact for guiding said at least one male contact into said at least one through-hole in said mount, said mount including first and second mount components connectable along a line transverse to the longitudinal axis of said at least one female contact, said first mount component being positioned below said second mount component, said at least one through-hole in said mount including a first portion disposed in said second mount component and a second portion disposed in said first mount component, said first and second portions being disposed coaxially relative to one another, said at least one female component being disposed in said first portion, and said funnel-shaped portion being disposed in said second portion on a side of said first mount component facing away from said second mount component.

10. A control device for pressurized fluids according to claim 9, further comprising a fastener for securing said first mount component and said second mount component together.

11. A control device for pressurized fluids according to claim 10, wherein said fastener includes at least one tongue-like member having a projection disposed on said first mount component and at least one recess disposed on said second mount component for engaging said projection on said at least one tongue-like member when said first and second mount components are joined together.

12. A control device for pressurized fluids comprising first and second housing components adapted to be removably coupled together, a first electric device in said first housing component, a second electric device in said second housing component, a valve mechanism in said first housing component in communication with said first electric device, said valve mechanism being controlled by said second electric device, said second electric device including a plate and at least one female electrical contact, said first electric device including at least one male electrical contact disposed opposite said at least one female contact, said at least one female contact and said at least one male contact forming an electric connection when said first and second housing components are joined together, a mount for said at least one female contact having at least one through-hole for receiving said at least one female contact, said mount being supported by said plate on a side facing said at least one male contact such that said at least one through-hole in said mount is oriented substantially coaxially with at least one through-hole in said plate, said at least one female contact being disposed in said at least one through-hole in said mount such that it extends into said at least one through-hole in said plate, and a pressure sensor supported by said plate, said pressure sensor in communication with a pressurized fluid port in said first housing component when said first and second housing components are joined together.

13. A control device for pressurized fluids according to claim 12, wherein said pressure sensor is mounted to a support disposed on said plate on a side facing said first housing component, said support including at least one brace member for bracing said support against said plate, said at least one brace member being oriented substantially in the direction of the longitudinal axis of said support and said pressure sensor and extending toward said plate, said pressure sensor including at least one electrical contact element extending into at least one opening in said plate to form an electrical connection between said pressure sensor and said second electric device.

14. A control device for pressurized fluids according to claim 13, wherein said at least one electrical contact element extends through said at least one opening in said plate such that a distal end of said at least one electrical contact element projects outwardly from said at least one opening in said plate on a side of said plate facing away from said pressure sensor.

15. A control device for pressurized fluids according to claim 13, wherein said at least one electrical contact element is integral with said at least one brace member.

16. A control device for pressurized fluids according to claim 13, further comprising a fastener for joining said support to said plate.

17. A control device for pressurized fluids according to claim 13, wherein said at least one brace includes an extension which extends through a hole in said plate, said extension having at its free end a projection oriented transversely relative to its longitudinal axis and overlapping a region of said plate bounding said hole after said plate and said support have been joined together to form a snap fit connection for said pressure sensor between said plate and said support.

18. A mount for an electrical contact in a device for controlling a valve mechanism, said device including means for controlling said valve mechanism, said means for controlling including a plate, said plate including an opening, said mount comprising a housing supported by said plate, and a first electrical contact for forming an electrical connection with a second electrical contact of said valve mechanism, said mount having a through-hole oriented substantially coaxially with said opening in said plate, said first electrical contact disposed in said through-hole such that said contact extends into said opening in said plate.

19. A mount according to claim 18, wherein said first electrical contact extends from said mount through said opening in said plate such that a distal end of said first electrical contact projects outwardly from said opening in said plate on a side of said plate facing away from said mount.

20. A mount according to claim 18, wherein said through-hole in said mount includes a funnel-shaped portion opening toward said second electrical contact for guiding said second electrical contact into said through-hole in said mount and into electrical contact with said first electrical contact.

21. A mount according to claim 20, wherein the cross-sectional size of said funnel-shaped portion at its narrowest point is at most equal to the cross-sectional size of a proximal end of said first electrical contact.

22. A mount according to claim 18, further comprising at least one spring element disposed in said first electrical contact oriented in the direction of the longitudinal axis of said first electrical contact and convex toward an imaginary centerline of said first electrical contact.

23. A mount according to claim 18, further comprising a fastener for attaching said mount on said plate.

24. A mount according to claim 18, wherein said plate is designed as a printed circuit board.

25. A mount for an electrical contact in a device for controlling a valve mechanism, said device including means for controlling said valve mechanism, said means for controlling including a plate, said plate including an opening, said mount comprising a housing supported by said plate, a first electrical contact for forming an electrical connection with a second electrical contact of said valve mechanism, a through-hole oriented substantially coaxially with said opening in said plate, said first electrical contact disposed in said through-hole such that said contact extends into said opening in said plate, said through-hole in said mount including a funnel-shaped portion opening toward said second electrical contact for guiding said second electrical contact into said through-hole in said mount and into electrical contact with said first electrical contact, and first and second mount components connectable along a line transverse to the longitudinal axis of said first electrical contact, said first mount component being positioned below said second mount component, said through-hole in said mount including a first portion disposed in said second mount component and a second portion disposed in said first mount component, said first and second portions being disposed coaxially relative to one another, said first electrical contact being disposed in said first portion, said funnel-shaped portion being disposed in said second portion on a side of said first mount component facing away from said second mount component.

26. A mount according to claim 25, further comprising a fastener for securing said first mount component and said second mount component together.

27. A mount according to claim 26, wherein said fastener includes at least one tongue-like member having a projection disposed on said first mount component and at least one recess disposed on said second mount component for engaging said projection on said at least one tongue-like member when said first and second mount components are joined together.

28. A control device for pressurized fluids comprising first and second housing components adapted to be removably coupled together, a first electric device in said first housing component, a second electric device in said second housing component, a valve mechanism in said first housing component in communication with said first electric device, said valve mechanism being controlled by said second electric device, said second electric device including at least one male electrical contact, said first electric device including a plate and at least one female electrical contact disposed opposite said at least one male contact, said at least one male contact and said at least one female contact forming an electric connection when said first and second housing components are joined together, a mount for said at least one female contact having at least one through-hole for receiving said at least one female contact, said mount being supported by said plate on a side facing said at least one male contact such that said at least one through-hole in said mount is oriented substantially coaxially with at least one through-hole in said plate, and said at least one female contact being disposed in said at least one through-hole in said mount such that it extends into said at least one through-hole in said plate.

29. A control device for pressurized fluids according to claim 28, wherein said at least one female contact extends from said mount through said at least one through-hole in said plate such that a distal end of said at least one female contact projects outwardly from said at least one through-hole in said plate on a side of said plate facing away from said mount.

30. A control device for pressurized fluids according to claim 28, wherein said at least one through-hole in said mount includes a funnel-shaped portion opening toward said at least one male contact for guiding said at least one male contact into said at least one through-hole in said mount.

31. A control device for pressurized fluids according to claim 30, wherein the cross-sectional size of said funnel-shaped portion at its narrowest point is at most equal to the cross-sectional size of a proximal end of said at least one female component.

32. A control device for pressurized fluids according to claim 28, further comprising at least one spring element disposed in said at least one female contact oriented in the direction of the longitudinal axis of said at least one female contact and convex toward an imaginary centerline of said at least one female contact.

33. A control device for pressurized fluids according to claim 28, wherein said mount for said at least one female contact is detachably joined to said plate by a fastener.

34. A control device for pressurized fluids according to claim 28, wherein said plate is designed as a printed circuit board.

35. A control device for pressurized fluids according to claim 28, wherein said first electric device includes at least one electromagnet.

36. A control device for pressurized fluids comprising first and second housing components adapted to be removably coupled together, a first electric device in said first housing component, a second electric device in said second housing component, a valve mechanism in said first housing component in communication with said first electric device, said valve mechanism being controlled by said second electric device, said second electric device including at least one male electrical contact, said first electric device including a plate and at least one female electrical contact disposed opposite said at least one male contact, said at least one male contact and said at least one female contact forming an electric connection when said first and second housing components are joined together, a mount for said at least one female contact having at least one through-hole for receiving said at least one female contact, said mount being supported by said plate on a side facing said at least one male contact such that said at least one through-hole in said mount is oriented substantially coaxially with at least one through-hole in said plate, said at least one female contact being disposed in said at least one through-hole in said mount such that it extends into said at least one through-hole in said plate, said at least one through-hole in said mount including a funnel-shaped portion opening toward said at least one male contact for guiding said at least one male contact into said at least one through-hole in said mount, said mount including first and second mount components connectable along a line transverse to the longitudinal axis of said at least one female contact, said at least one through-hole in said mount including a first portion disposed in said second mount component and a second portion disposed in said first mount component, said first and second portions being disposed coaxially relative to one another, said at least one female component being disposed in said first portion, and said funnel-shaped portion being disposed in said second portion on a side of said first mount component facing away from said second mount component.

37. A control device for pressurized fluids according to claim 36, further comprising a fastener for securing said first mount component and said second mount component together.

38. A control device for pressurized fluids according to claim 37, wherein said fastener includes at least one tongue-like member having a projection disposed on said first mount component and at least one recess disposed on said second mount component for engaging said projection on said at least one tongue-like member when said first and second mount components are joined together.

39. A control device for pressurized fluids, comprising first and second housing components adapted to be removably coupled together, a first electric device in said first housing component, a second electric device in said second housing component, a valve mechanism in said first housing component in communication with said first electric device, said valve mechanism being controlled by said second electric device, said second electric device including at least one male electrical contact, said first electric device including a plate and at least one female electrical contact disposed opposite said at least one male contact, said at least one male contact and said at least one female contact forming an electric connection when said first and second housing components are joined together, a mount for said at least one female contact having at least one through-hole for receiving said at least one female contact, said mount being supported by said plate on a side facing said at least one male contact such that said at least one through-hole in said mount is oriented substantially coaxially with at least one through-hole in said plate, said at least one female contact being disposed in said at least one through-hole in said mount such that it extends into said at least one through-hole in said plate, and a pressure sensor, said pressure sensor in communication with a pressurized fluid port in said first housing component when said first and second housing components are joined together.

* * * * *